United States Patent Office 3,351,150
Patented Nov. 7, 1967

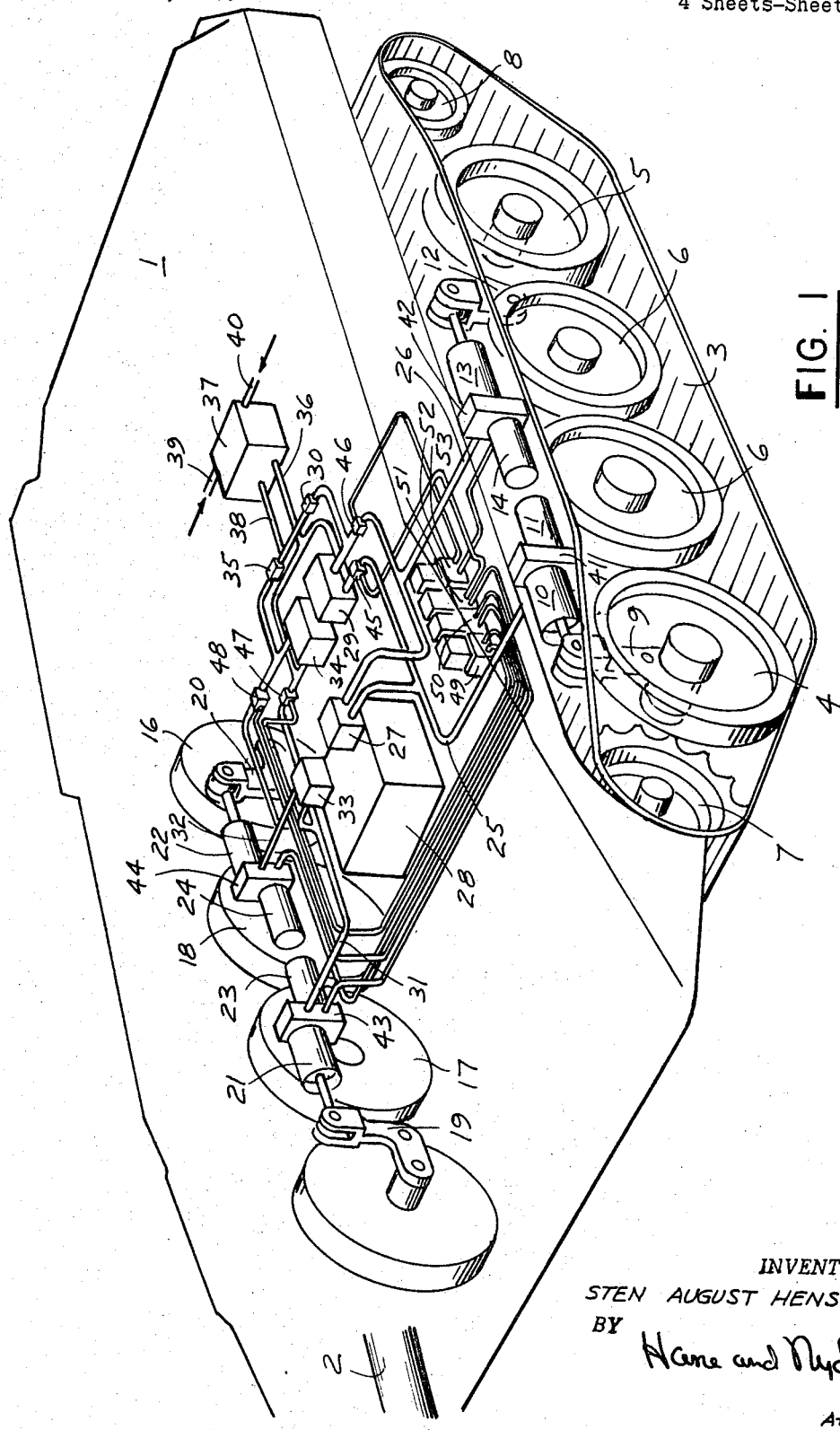
INVENTOR
STEN AUGUST HENSTRÖM
BY Hane and Nydick
ATTORNEYS

3,351,150
YIELDABLE SUSPENSION DEVICE FOR A
TRACK LAYING VEHICLE
Sten August Henström, Bofors, Sweden, assignor to Aktiebolaget Bofors, Bofors, Sweden, a corporation of Sweden
Filed Oct. 18, 1965, Ser. No. 497,119
Claims priority, application Sweden, Dec. 4, 1964, 14,654/64
6 Claims. (Cl. 180—9.2)

ABSTRACT OF THE DISCLOSURE

A suspension device for a track-supporting wheel of a track laying vehicle which permits rapid and accurate adjustment of the wheel in reference to the chassis vehicle even under very severe operational conditions.

---

The present invention relates to a yieldable suspension device such as a track-supporting wheel of a track laying vehicle. More particularly, the invention relates to a yieldale suspension device comprising a first hydraulic damping cylinder containing a suitable damping fluid, such as oil, a second hydraulic damping cylinder connected to the first damping cylinder by a conduit including a damping valve and transmission means responsive to changes in the position of the wheel and controlling the fluid pressure in the first damping cylinder in accordance with the position of said wheel.

Yieldable suspension devices of the general kind above referred to are particularly suitable for use with track laying assault vehicles mounting a weapon in fixed position, such as an armored tank or other weapon carrier on which a gun is fixedly mounted. The gun on a tank or other track laying weapon carrier of this kind is trained in traverse by turning the entire vehicle and in elevation, at least to a certain extent, by changing the position of the chassis of the vehicle in reference to ground on which the vehicle rests. Assault vehicles of the general kind herein referred to are required to be capable of travelling at comparatively high speed even across rough country. Moreover, it is essential that any damage to one of the suspended track-supporting wheels of the vehicle, especially the end wheels thereof, for instance, due to enemy action, can be restricted in its effect as much as possible and that the vehicle as a whole remains operable even though one of its end wheels or other wheels is put out of operation.

The damping valve interposed between the first damping cylinder and the second damping cylinder of the suspension device and the function of such damping valve has been more fully described in co-pending application Ser. No. 496,623, filed Oct. 15, 1965, and assigned to the same assignee as the present application. It suffices to state that one of the purposes of such damping valve is to render more effective and also more rapid the shock absorbing action of the damping cylinders, especially when the suspended wheel is subjected to heavy shocks, or otherwise considerably moved out of its normal position.

It has further been proposed in another pending application of the assignee herein in connection with assault vehicles of the general kind above referred to, to control the position of the vehicle and more specifically of the chassis thereof in reference to the ground by means of reversible pumps with a variable pumping capacity which are connected with the damping cylinders of the suspension device to feed damping fluid to the cylinders or to discharge such fluid therefrom. As it is evident, a change in the volume of the damping fluid contained in the damping cylinders and thus of the pressure thereof will result in a corresponding change in the support capability of the device. As it is also evident, a change in the support capability of the device will cause a corresponding change in the position of the vehicle in reference to ground, thus permitting an elevational training of the gun or missile launchers supported on the vehicle. A device for controlling the position of the vehicle in reference to the ground and with it the elevation of the weapon carried on the vehicle is more fully described in prior pending appliction Ser. No. 499,190, filed Oct. 21, 1965, and assigned to the same assignee as the present application.

It is an object of the present invention to provide a novel and improved yieldable suspension device for a track laying vehicle of the general kind above referred to, especially for an assault vehicle mounting a missile firing weapon in fixed position which suspension device permits travel of the vehicle at comparatively high speed even over a rough terrain and an elevational training of the weapon by varying the position of the vehicle in reference to the ground.

A more specific object of the invention is to provide a novel and improved yieldable suspension device of the general kind above referred to in which the damping fluid fed to or discharged from the damping cylinders of the suspension device for the purpose of controlling the position of the vehicle in reference to ground is utilized to cool the damping valve, especially the movable valve member or slide thereof. Such cooling of the damping valve has been found necessary or at least advantageous to assure a reliable operation of the damping valve and with it of the entire suspension device.

The aforementioned objects, features and advantages of the invention and other objects, features and advantages which will be pointed out hereinafter are attained with a yieldable suspension device including a damping valve which comprises a movable valve slide which is preferably spring loaded in both directions. The valve slide includes a collar, which may have a generally frusto-conical configuration and is biased against a valve seat in a valve chamber. The position of the slide controls a flow of damping fluid from the first damping cylinder to the second damping cylinder and vice-versa. The valve seat divides the valve chamber into two compartments, one leading to the first damping cylinder and the other to the second damping cylinder. The compartment leading to the first damping cylinder is connected to a conduit for feeding damping fluid to or discharging from this cylinder and the other compartment is connected to a conduit for feeding the fluid to a cooler and then supplying the cooled fluid to the cylinders. The admission of the cooled fluid can be closed off by a suitable valve system which may be also used for controlling the feed of the fluid to and the discharge from the first damping cylinder. The conduits for controlling the flow of damping fluid to and from the first damping cylinder may include one or several safety valves responsive to the fluid pressure in the first damping cylinder as will be more fully described hereinafter.

The invention will be more fully described in connection with the accompanying drawing showing the embodiment of the invention by way of illustration and not by way of limitation.

In the drawing:

FIG. 1 is a diagrammatic perspective view of a track laying weapon carrier equipped with a yieldable suspension device according to the invention;

Figure 2:
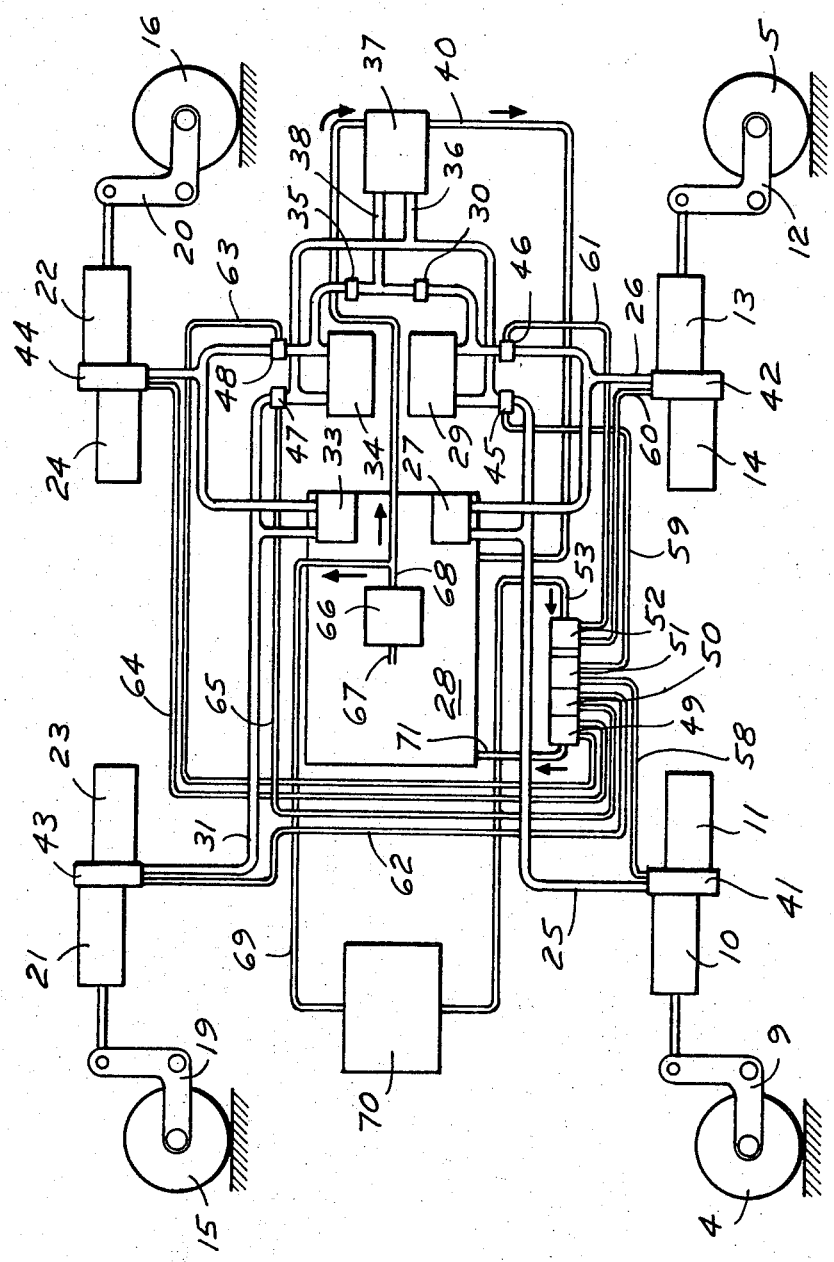
FIG. 2 is a diagram of the suspension device according to FIG. 1.

Referring first to FIGS. 1 and 2 in detail, the assemblage exemplified in these figures shows a track laying vehicle 1 on which is fixedly mounted a gun indicated by a barrel 2. The vehicle is driven by two tracks, only track 3 being shown. The track is guided over two end wheels 4 and 5 and two intermediate wheels 6. It is driven by a drive wheel 7 which should be visualized as being driven by a suitable engine (not shown) and is tensioned by a tension roller 8. End wheel 4 is supported by a bell crank lever 9 which is pivotal in a plane parallel to the lengthwise axis of the vehicle. Lever 9 is coupled to a piston (not shown) slidable in a damping cylinder 10 containing a suitable damping fluid, such as oil, said cylinder and piston constituting a control unit. Cylinder 10 is coupled by a damping valve 41 to a second damping cylinder 11 which may include a floating piston to define a closed cylinder space on the side of cylinder 11 opposite to cylinder 10. The space in cylinder 11 thus defined may be filled with a pressurized inert gas, such as nitrogen. Cylinder 11 constitutes a hydraulic pressure storage means. A damping unit including connected cylinders 10 and 11 is more fully described in co-pending application Ser. No. 491,655, filed Sept. 30, 1965, and assigned to the same assignee as the present application.

End wheel 5 is similarly supported by a bell crank lever 12 which is coupled to a piston in a damping cylinder 13 connected by a damping valve 42 to a second damping cylinder 14. End wheels 15 and 16 for the second track of the vehicle (not shown) are supported by bell crank levers 19 and 20 respectively which, in turn, are coupled to connected damping cylinders 21, 23, and damping cylinders 22, 24 are connected by damping valves 43 and 44, respectively. The damping units for all four end wheels 4, 5, 15 and 16 are alike and generally arranged as described in connection with end wheel 4.

The valves 41 and 42 respectively between damping cylinders 10 and 13 and storage cylinders 11 and 14, respectively, are connected to pipes 25 and 26 which, in turn, are connected by branch pipes to a safety valve 27 secured on an oil supply container 28. Pipes 25 and 26 are further connected to a pump 29. The pump should be visualized as a conventional reversible pump with a variable pumping capacity. Similarly, the valves 43 and 44 respectively between damping piston 21 and storage cylinder 23 and between damping cylinder 22 and storage cylinder 24 are connected by pipes 31 and 32 to a safety valve 33 mounted on oil supply container 28. The two pipes 31 and 32 are further connected to a pump 34 which is also a reversible pump with variable pumping capacity.

Finally, pipes 25 and 31 are connected by a common pipe 36 to a valve 37. This valve is further connected by a common pipe 38 to pipes 26 and 32. The pipes 26 and 32, before being joined to the common pipe 38, include one-way valves 30 and 35, respectively. Valve 37 is supplied with pressurized hydraulic fluid via a conduit 39. The fluid supplied to the valve is discharged through a conduit 40.

The assemblage further comprises four interconnected cut-off valves 45, 46, 47 and 48 which are operated by four control valves 49, 50, 51 and 52. The control valves are supplied with pressurized fluid through a common feed pipe 53. They are connected with each of the four cut-off valves 45 to 48 and also with each of the four damping valves 41 to 44.

Hydraulic pressure fluid such as oil is withdrawn through a pipe 67 from tank 28 by a conventional pump 66 and is pumped through pipes 68, 69 to a conventional cooler 70 from which the cooled pressure fluid flows into the common feed pipe 53. Pump 66 also pumps pressure fluid to valve 37 through pipe 39. Pipes or conduits 40 or 71 return the pressure fluid from valve 37 and control valve 49, respectively, to tank 28.

Figure 3:
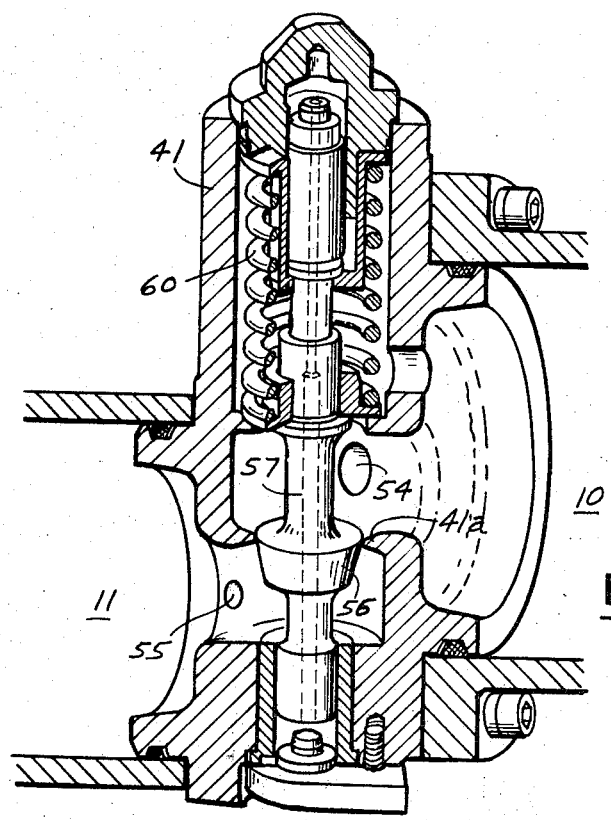
FIG. 3 is an elevational sectional view of one of the damping valves of the device.

One of the four damping valves, to wit, valve 41, is shown in detail in FIG. 3. The valve as shown in this figure is more fully described in pending application Ser. No. 496,623, filed Oct. 15, 1965, and assigned to the same assignee as the present application.

The valve as shown in FIG. 3 comprises a valve housing in which is lengthwise slidable a valve member or valve slide 57. A spring 60 biases the valve slide 57 in either direction of displacement into a position in which the valve closes the flow passage or connection between cylinders 10 and 11 by engagement of a generally conical flange or collar 56 of valve member 57 with a valve seat 41a formed in valve chamber of valve 41. The valve chamber is divided by valve seat 41a into two compartments. The compartment contiguous to cylinder 10 includes a port or duct 54. The compartment contiguous to cylinder 11 includes a port or duct 55.

Pipe 25 is connected to port 54 and a pipe 58 extends from port 55 of damping valve 41 to control valve 51 which, in turn, is connected by a pipe 59 to cut-off valve 45 to transmit pressure fluid pulses from valve 51 to valve 45.

Similarly, damping valve 42 is connected by a pipe 60 to control valve 52 which is further connected by a pipe 61 to shut-off valve 46 to transmit pressure fluid pulses to valve 46. Damping valve 43 is connected by a pipe 62 to control valve 50 which, in turn, is connected by a pipe 65 to shut-off valve 47 to transmit pressure fluid pulses to the same. Finally, damping valve 44 is connected by a pipe 64 to control valve 49 which is connected by a pipe 63 to shut-off valve 48 to transmit pressure fluid pulses to the same.

Figure 4:
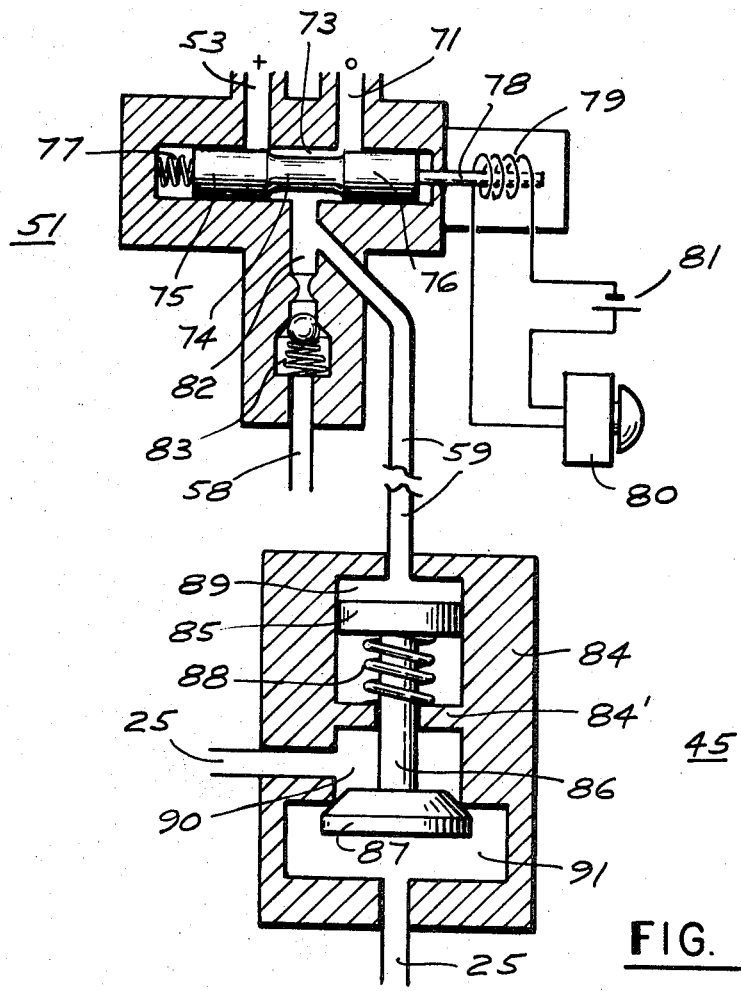
FIG. 4 is a sectional view of one of the control valves and the shut-off valves of the suspension device.

Referring now to FIG. 4 which shows by way of example control valve 51 and shut-off valve 45. (All the other control valves and shut-off valves should be visualized as being similarly constructed.)

Control valve 51 comprises a valve housing 72 including a cylinder chamber 73 in which a valve member 74 is slideable. The valve member has two collars 75 and 76 which are so disposed that in one position of the valve member the connection of pipe 53 to cylinder chamber 73 is closed and the connection of return pipe 71 to chamber 73 is open while in another position of valve member the connection of pipe 53 is open and the connection of pipe 71 is closed. A loaded spring 77 biases the valve member into its right hand position in which pipe 71 is connected and pipe 53 is closed. The position of the valve member can be controlled by means of an iron core 78 and a solenoid coil 79. The coil is connected to a source of current 81 via a normally open switch 80. Closing of the switch energizes coil 79 which attracts core 78 so as to push valve 74 toward the left against the action of spring 77, that is, into a position in which pipe 71 is closed and pipe 53 is open.

Cylinder chamber 73 is further connected to a duct 82 which is extended into two pipes 58 and 59. Pipe 58, which leads to damping valve 41, includes a one-way check valve 83 so that pressure fluid can flow via duct 82 toward valve 41, but not in the opposite direction. Pipe 59 is connected to shut-off valve 45.

The shut-off valve comprises a valve housing 84 including two chambers separated by a wall 84'. Chamber 89 houses a piston 85 which is connected by a rod 86 mounting a generally conical valve member 87 which divides the second chamber into two compartments 90 and 91. Piston 85 is urged by a spring 88 into the position in which valve member 87 closes compartments 90 and 91 against each other as is shown in FIG. 4. Chamber 89 is connected to pipe 59 and compartments 90, 91 are included in pipe 25. As is evident from FIG. 4, pipe 25 is shut-off by valve member 87 when the same is in the illustrated position and open when the valve member is forced away from its seat against the action of spring 88.

Control valve 51 and shut-off valve 45 operate as follows:

When switch 80 is open, valve member 74 is held by spring 77 in the position shown in FIG. 4, that is, pipe 53 is closed by the valve member and return pipe 71 is connected to duct 82 via chamber 73. Accordingly, chamber 73 is connected to tank 28 via pipe 71 so that no fluid pressure is acting upon valve member 74. Similarly, there is no fluid pressure built up in chamber 89 since this chamber is also connected via pipe 59, duct 82 and chamber 73 to return pipe 81. Accordingly, spring 88 maintains valve member 87 in the illustrated closing position so that the flow of fluid through pipe 25 is shut off by valve 45. However, the pressure in pipe 58 connected to damping valve 41 is maintained since one-way valve 83 prevents the fluid in pipe 58 from flowing out through pipe 71.

When now switch 80 is closed, the now excited coil 79 displaces valve member 74 toward the left against the action of spring 77 thereby closing return pipe 71 by collar 76 and opening the connection between pipe 53 and chamber 73. Pump 66 will now suck fluid from tank 28 through pipe 67 and pump the fluid via pipes 68 and 69 into cooler 70. The cooled fluid is then fed through pipe 53 to control valve 51 from which it will flow via chamber 73, duct 82, pipe 59 into chamber 89 of shut-off valve 45. Accordingly, the oil pressure built up in the chamber forces valve member 87 into its open position against the action of spring 88 thereby opening pipe 25 via compartments 90 and 91.

The cooled fluid flowing into chamber 73 further flows via duct 82, one-way valve 83 and pipe 58 into control valve 41 (see FIG. 3) through port 55 thereby lifting valve member 57 and cooling the same as it flows past the valve member and out through pipe 25.

The suspension assemblage as hereinbefore described functions as follows:

Let it be assumed that it is desired to feed hydraulic fluid to the respective damping cylinders or to discharge fluid from said cylinders for the purpose of training the elevation of gun barrel 2 supported on vehicle 1, or that it is desired to compensate for hydraulic pressure fluid discharged from the cylinders by means of safety valve 27 and/or safety valve 33. The safety valves respond when the fluid pressure in the damping cylinder of the unit, such as cylinder 10, is above a predetermined pressure. Such control of the pressure fluid, either for feeding or discharge, is effected by opening cut-off valves 45 through 48.

The structure and the function of saefty valves 27 and 33 are more fully described in pending application Ser. No. 496,623, filed Oct. 15, 1965, and assigned to the same assignee as the present application.

Opening of cut-off valves 45 to 48 is effected by a feed of pressure fluid from control valves 49 through 52 which, in turn, may be electrically controlled by signals supplied to solenoids coacting with the control valves for controlling the same. Simultaneously, pressure fluid cooled in cooler 70 is supplied through pipe 53 to control valves 49 through 52, and is fed to the damping cylinders via the pipes connecting these cylinders with control valves 49 through 52. The cooled pressure fluid enters the damping units, such as the damping including cylinders 10 and 11, on the side of cylinder 11 thereof through port or duct 55 as previously described.

The cooled pressure fluid will flow from port 55 past the collar of valve slide 56, thereby cooling the same. In the event port or duct 54 should be used for discharging of hydraulic pressure fluid simultaneously with the feed-in of cooled pressure fluid through port 55, part of the fluid will flow out through port 54. The volume of fluid to be discharged through port 54 is thus somewhat larger than if no cooled pressure fluid would have been fed into the cylinders, but such an increased discharge flow does not, in any way, impede the operation of the device since the fluid used for cooling is the same as used for operating the device.

Similarly, in the event fluid is fed through port 54 simultaneously with the feed-in of cooled fluid through port 55, the total volume of hydraulic fluid in cylinders 10 and 11 is now somewhat larger than it would have been without such simultaneous feed, but such increased total volume of fluid has again no appreciable effect upon the functioning of the device.

As has been stated before, each of the four control valves 49 through 52 controls the corresponding damping valves 41 to 44 and the cut-off valves 45 to 48 associated therewith. In normal operation, all control valves are simultaneously set for operation whereby the position of the vehicle in relation to ground can be controlled as previously described.

Under certain conditions, for instance, when the vehicle is driving along a road or on comparatively smooth terrain, a control of the position of the vehicle in relation to ground is not necessary. The control valves 49 through 52 may then be disconnected and the cut-off valves may be closed.

Due to the fact that, as previously stated, each damping valve has its own control valve and cut-off valve, the supply of hydraulic damping fluid and the discharge of such fluid can be selectively cut-off for one or several damping valves. Of course, such cut-off eliminates adjustability of the wheel coacting with the respective damping valve. However, such a partial disconnection may be advantageous under certain conditions, for instance, if one of the wheels coupled with a suspension device is damaged. Such damaged wheel, such an an end wheel, or possibly the two end wheels on the same side of the vehicle, may then be disconnected so that it does not interfere with the operation of the vehicle. A possibility of adjusting the elevation of gun barrel 2 is still available under such conditions though within a more limited range than is available when all four suspension devices and the end wheels coacting therewith are fully operational.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A yieldable suspension device for a track supporting wheel mounted on the chassis of a track laying vehicle, said device comprising in combination: a wheel; movable mounting means supporting said wheel variably positionable in reference to said chassis; a hydraulically operable control means (10) coupled to said mounting means to control the same for positioning said wheel and controllable by the pressure of fluid therein; pressure fluid storage means (11) for damping the action of said control means; a damping valve means (41) interconnecting said control means and said storage means, opening and closing of said damping valve means controlling the fluid pressure in said control means; a first conduit (58) connected to said damping valve means for feeding pressure fluid to said damping valve means to control the position thereof thereby correspondingly varying the fluid pressure in the control means; a second conduit (25) connected to said damping valve means for discharging pressure fluid therefrom; cooling means (70) interconnecting said first and second conduits for cooling pressure fluid prior to feeding the same to the damping valve means through said first conduit; control valve means (51) included in said first conduit for controlling the fluid flow therethrough; and actuating means (80, 78, 79) for selectively operating said control valve means.

2. A yieldable suspension device according to claim 1 wherein said control valve means (41) include safety means responsive to the fluid pressure in said control valve means to open the same in response to a fluid pressure above a predetermined value in said control valve means.

3. A yieldable suspension device according to claim 1, wherein said damping valve means comprises a valve housing including a valve chamber and a valve seat defining a valve opening and dividing said valve chamber into two compartments, one of said compartments being connected to the control means (10) and the other to the storage means (11), a valve member movable in said valve chamber and biased into engagement with said valve seat to close said valve opening, said second conduit being connected to said one compartment and said first conduit being connected to said other compartment.

4. A yieldable suspension device according to claim 3, wherein said valve member has a generally conical collar engageable in one lengthwise position of the valve member with said valve seat and opening a flow passage between the collar and the valve seat in another lengthwise position of the valve member, a flow of cooled pressure fluid from said first to said second conduit passing said collar thereby cooling the same.

5. A yieldable suspension device according to claim 1 and comprising second control valve means (45) included in said second conduit for controlling the flow of fluid therethrough.

6. A yieldable suspension device according to claim 1 wherein said actuating means (80) are common to said first and said second control valve means.

References Cited

UNITED STATES PATENTS

| | | | |
|---|---|---|---|
| 3,082,043 | 3/1963 | Orton | 180—9.2 X |
| 3,183,016 | 5/1965 | Gustafsson. | |
| 3,246,405 | 4/1966 | Reynolds | 305—27 X |
| 3,254,738 | 6/1966 | Larsen | 180—9.2 |

BENJAMIN HERSH, *Primary Examiner.*

RICHARD J. JOHNSON, *Examiner.*